United States Patent
Soma (10) Patent No.: US 8,330,926 B2
(45) Date of Patent: Dec. 11, 2012

(54) LIQUID CRYSTAL DISPLAY AND MANUFACTURING METHOD THEREOF

(75) Inventor: Yuki Soma, Kumamoto (JP)

(73) Assignee: Mitsubishi Electric Corporation, Tokyo (JP)

(*) Notice: Subject to any disclaimer, the term of this patent is extended or adjusted under 35 U.S.C. 154(b) by 1085 days.

(21) Appl. No.: 12/025,092

(22) Filed: Feb. 4, 2008

(65) Prior Publication Data

US 2008/0225220 A1    Sep. 18, 2008

(30) Foreign Application Priority Data

Mar. 14, 2007  (JP) ................. 2007-064910

(51) Int. Cl.
*G02F 1/133* (2006.01)
*G02F 1/1333* (2006.01)
*G02F 1/1339* (2006.01)
*G02F 1/1345* (2006.01)

(52) U.S. Cl. ........ 349/152; 349/116; 349/122; 349/153; 349/156

(58) Field of Classification Search .......... 349/84, 349/116, 122, 139, 149, 152, 153, 155, 156; 372/18, 29.023
See application file for complete search history.

(56) References Cited

U.S. PATENT DOCUMENTS

| | | | |
|---|---|---|---|
| 5,410,423 A | 4/1995 | Furushima et al. | |
| 2003/0118922 A1* | 6/2003 | Hayashi et al. | 430/7 |
| 2005/0219456 A1* | 10/2005 | Tadaki et al. | 349/156 |
| 2006/0082695 A1* | 4/2006 | Miyashita | 349/58 |
| 2007/0040972 A1* | 2/2007 | Lee et al. | 349/122 |

FOREIGN PATENT DOCUMENTS

| | | |
|---|---|---|
| JP | 2-68525 | 3/1990 |
| JP | 5-232422 | 9/1993 |
| JP | 10-68957 | 3/1998 |
| JP | 11-212102 | 8/1999 |
| JP | 2000-305060 | 11/2000 |
| JP | 2003-5205 | 1/2003 |

* cited by examiner

*Primary Examiner* — Jerry Blevins
(74) *Attorney, Agent, or Firm* — Oblon, Spivak, McClelland, Maier & Neustadt, L.L.P.

(57) ABSTRACT

A liquid crystal display includes a terminal substrate, an opposed substrate, a seal member and a protective wall. The terminal substrate includes: a display area which displays an image, a terminal which inputs an external signal to a wiring in the display area, and a connection conductor which electrically connects the wiring in the display area and the terminal. The opposed substrate includes a conductive film on a surface thereof. The seal member surrounds the display area and through which the terminal substrate and opposed substrate are attached with each other while being opposed with each other. The protective wall surrounds a proximity portion of the connection conductor and the conductive film outside of an area surrounded by the seal member, together with the seal member to isolate and protect the proximity portion from an outside.

13 Claims, 8 Drawing Sheets

LIQUID CRYSTAL DISPLAY AND MANUFACTURING METHOD THEREOF

CROSS-REFERENCE TO RELATED APPLICATIONS

This application is based upon and claims the benefit of priority from Japanese Patent Application No. 2007-064910, filed Mar. 14, 2007, the entire contents of which are incorporated herein by reference.

BACKGROUND OF THE INVENTION

1. Field of the Invention

This invention relates to a liquid crystal display and a manufacturing method thereof.

2. Description of the Related Art

In a manufacturing method of a liquid crystal display, when cells are cut or after liquid crystal is injected into the cut cells, a step of cleaning each cell is executed. A liquid for the cleaning may enter the cell or corrosion may occur in a terminal portion, etc., because of the remaining liquid. JP-A-5-232422 discloses a technique to surround the outer peripheral portion of a substrate with a seal, thereby preventing liquid entry at the cleaning time when a cut scratch at cutting cells is formed.

SUMMARY OF THE INVENTION

To use the method of JP-A-5-232422 as described above, it is effective for preventing corrosion at the cleaning time before cell cutting, but is not effective for cleaning executed after injecting liquid crystal or after injection hole sealing performed after cell cutting; liquid for cleaning enters an area sandwiched between the substrate and the seal and terminal corrosion occurs in a terminal drawing wiring part in the proximity of the seal.

An aspect of the present invention has been made in view of the above mentioned circumstances and provides a high-yield and high-reliability liquid crystal display and a manufacturing method thereof.

According to an aspect of the present invention, there is provided a liquid crystal display includes a terminal substrate, an opposed substrate, a seal member and a protective wall. The terminal substrate includes: a display area which displays an image, a terminal which inputs an external signal to a wiring in the display area, and a connection conductor which electrically connects the wiring in the display area and the terminal. The opposed substrate includes a conductive film on a surface thereof. The seal member surrounds the display area and through which the terminal substrate and opposed substrate are attached with each other while being opposed with each other. The protective wall surrounds a proximity portion of the connection conductor and the conductive film outside of an area surrounded by the seal member, together with the seal member to isolate and protect the proximity portion from an outside.

According to the invention, yield degradation caused by corrosion around the terminal can be suppressed and a highly reliable liquid crystal display can be provided easily.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION OF THE INVENTION

First Embodiment

Figure 1:
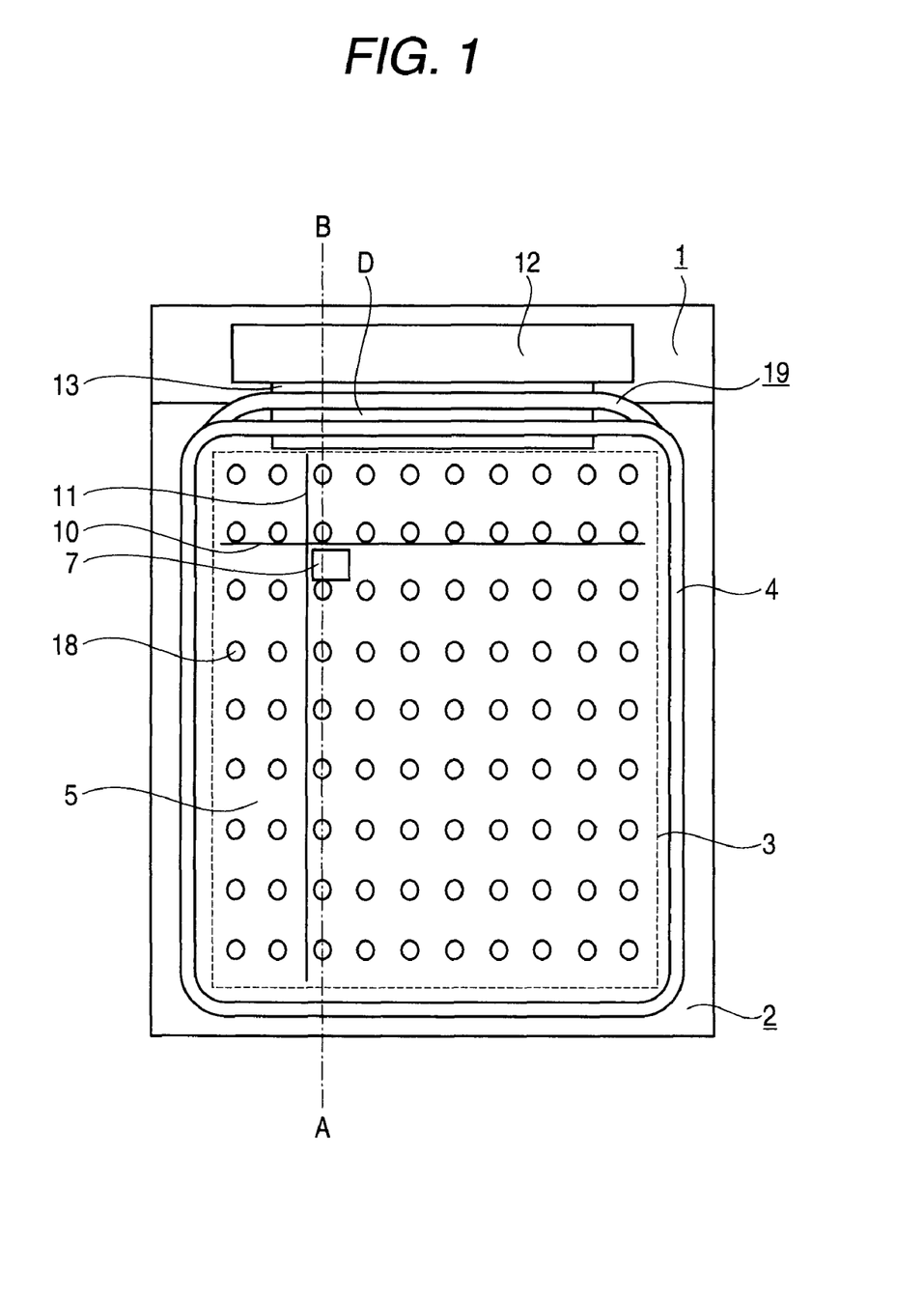
FIG. 1 is a plan view to show the whole of a liquid crystal display in a first embodiment of the invention.
Figure 2:
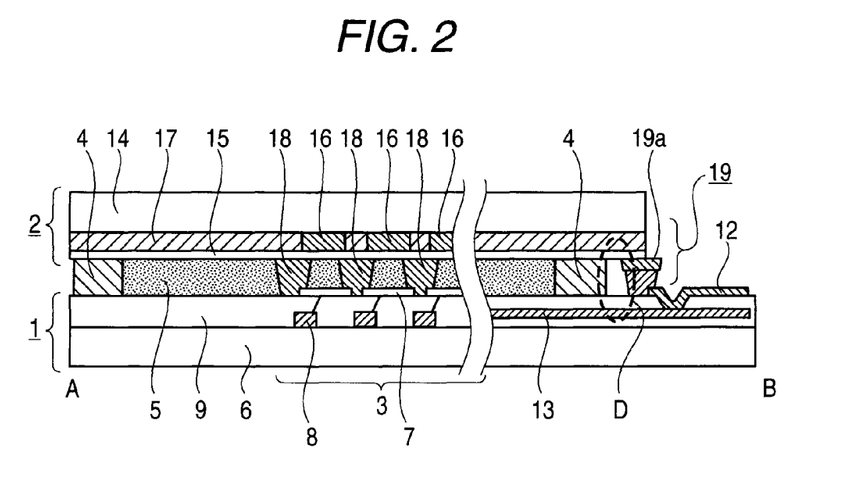
FIG. 2 is a sectional view to show the liquid crystal display in the first embodiment of the invention.

A liquid crystal display of a first embodiment of the invention will be discussed with FIGS. 1 and 2. FIG. 1 is a plan view to show the whole liquid crystal display and FIG. 2 is a sectional view taken on dashed line A-B in FIG. 1. The figures are schematic and do not reflect exact dimensions of shown components, etc. Throughout the Specification, components identical with those previously described with reference to the accompanying drawings are denoted by the same reference numerals and will not be discussed again. This is also applied in other figures.

The liquid crystal display of the first embodiment includes a terminal substrate 1, a color filter substrate 2 opposed to the terminal substrate 1, a seal 4 formed so as to surround a display area 3 for displaying an image in the peripheral portion of the color filter substrate 2, and liquid crystal 5 filled into the space between the terminal substrate 1 and the color filter substrate 2, surrounded by the seal 4, as shown in FIGS. 1 and 2.

The terminal substrate 1 has an orientation film (not shown) for orienting the liquid crystal 5 on one plane of a glass substrate 6 of a transparent substrate, pixel electrodes 7 provided in the display area 3 in the lower portion of the orientation film for applying a voltage for driving the liquid crystal 5, switching elements 8 of TFTs (Thin Film Transistors), etc., for supplying a voltage to the pixel electrodes 7, an insulating film 9 for covering the switching elements 8, gate wiring 10 and source wiring 11 of wiring for supplying a signal to the switching elements 8, a terminal 12 for accepting the signal supplied to the switching elements 8 from the outside, drawing wiring 13 of a connection conductor drawn from the gate wiring 10 and the source wiring 11 in the display area 3 surrounded by the seal 4 to the outside of the seal 4 for electrically connecting the gate wiring 10 and the source wiring 11 and the terminal 12, and the like. The terminal substrate 1 also has a polarizing plate (not shown) on an opposite side of the glass substrate 6.

On the other hand, the color filter substrate 2 has an orientation film (not shown) for orienting the liquid crystal 5 on one plane of a glass substrate 14 of a transparent substrate, a common electrode 15 made of a conductive film placed in the lower portion of the orientation film for producing an electric field with the pixel electrodes 7 on the terminal substrate 1 for driving the liquid crystal 5, a color filter 16 and a shading layer 17 provided in the lower portion of the common electrode 15, and the like. Like the terminal substrate 1, the color filter substrate 2 also has a polarizing plate (not shown) on an opposite side of the glass substrate 14. Further, glass is used as the material of the transparent substrate, but any other material such as transparent plastic or quartz may be used if it is transparent.

As shown in FIGS. 1 and 2, in the liquid crystal display of the first embodiment, the terminal substrate 1 and the color filter substrate 2 are put on each other via columnar spacers 18 fixedly secured to the color filter substrate 2 formed in the display area 3 together with the seal 4 for controlling the distance between the substrates. A protective wall 19 made of the same material as the columnar spacers 18 is formed so as to surround a proximity portion D of the drawing wiring 13 and the common electrode 15 together with the seal 4 complementary to each other in the portion in which the drawing wiring 13 is formed in the outside of the seal 4. The protective wall 19 is formed as it is fixedly secured to the color filter substrate 2, but a protective wall base 19a in the vicinity of the fixedly secured portion in the protective wall 19 is formed of a different material from the columnar spacers 18, namely, is formed of a material lower in strength than the columnar spacers 18. The expression "to surround together with the seal 4 complementary to each other" is used to mean that the portion is completely surrounded by both the protective wall 19 and the seal 4.

Other components of the liquid crystal display of the first embodiment are similar to those of a general liquid crystal display and therefore will not be discussed in detail with the accompanying drawings; the liquid crystal display of the first embodiment includes a control board for generating a drive signal to be supplied to the switching elements 8, an FFC (Flexible Flat Cable) for electrically connecting the control board and the terminal and supplying the signal generated in the control board to the terminal 12, a backlight unit as a light source, and the like.

Figure 3A:
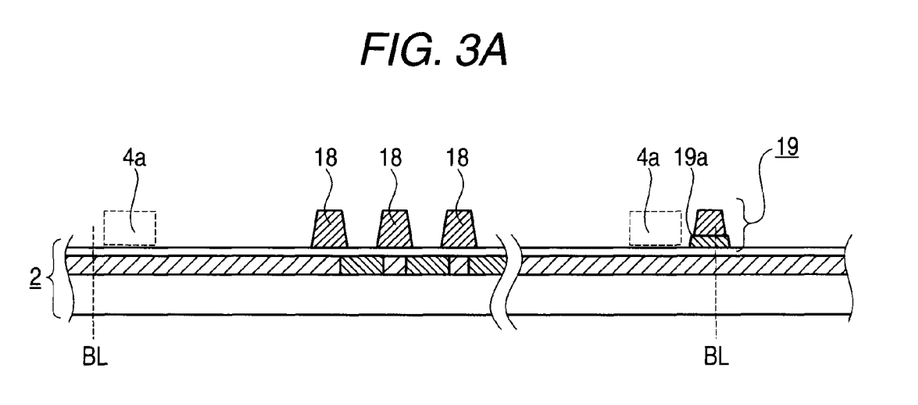
FIGS. 3A and 3B are sectional views in a manufacturing method of the liquid crystal display in the first embodiment of the invention.
Figure 3B:
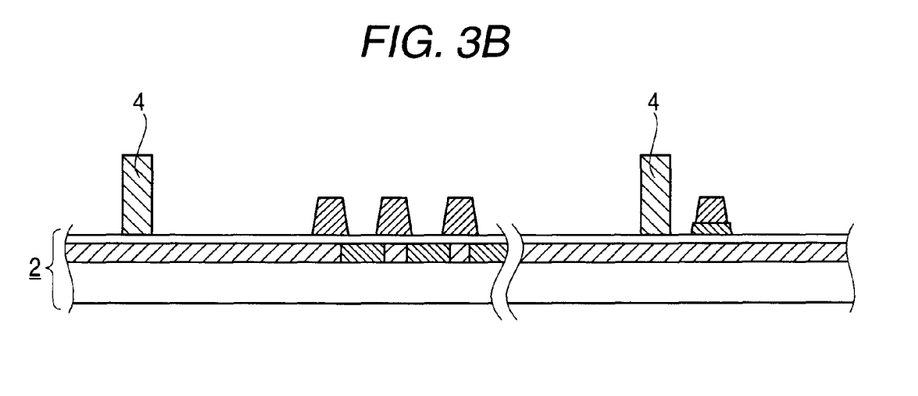
Figure 4A:
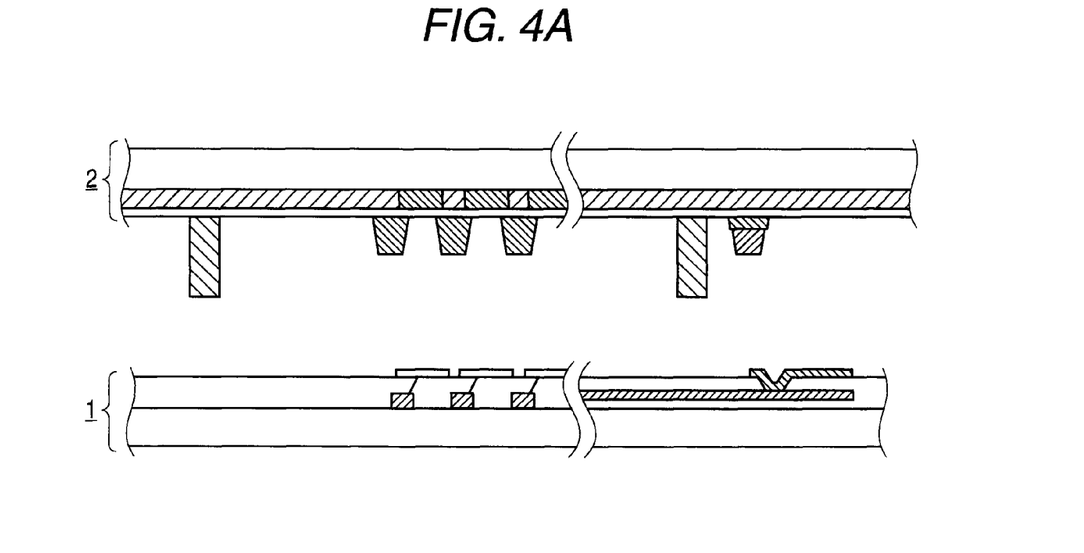
FIGS. 4A and 4B are sectional views in the manufacturing method of the liquid crystal display in the first embodiment of the invention.

Subsequently, a manufacturing method of the liquid crystal display in the first embodiment will be discussed with sectional views of FIGS. 3 and 4. The color filter substrate 2 is assumed to be a general substance and a manufacturing step thereof will not be discussed. In FIG. 3A, a seal formation planned position 4a of the formation position of seal 4 to be formed in a later step and a cut planned line BL in a cutting step executed in later steps are indicated by dotted lines. First, as in FIG. 3A, on the color filter substrate 2, columnar spacers 18 are formed of a photosensitive resin and protective wall 19 is formed of the same material as the columnar spacers 18 in the area outside the area surrounded by the seal formation planned position 4a. The protective wall 19 is formed so as to be across on the top of the cut planned line BL. The protective wall 19 is formed at the same time as the columnar spacers 18 by forming protective wall base 19a touching the color filter substrate 2, of a material different from that of the columnar spacers 18 and lower in strength than the columnar spacers 18 and then applying and patterning the same material as the columnar spacers 18, as in FIG. 3A.

Here, the protective wall base 19a made of a material different from that of the columnar spacers 18 is formed separately on the color filter substrate 2, but may be formed by leaving a part of color filter 16 or shading layer 17 as an isolated pattern at the same time in patterning the color filter 16 or the shading layer 17 during manufacturing of the color filter substrate 2.

Next, although not shown, a resin film of polyimide is formed on the color filter substrate 2 and rubbing treatment is performed on the surface, whereby an orientation film for orienting liquid crystal is formed. Subsequently, the seal 4 is formed on the color filter substrate 2 as in FIG. 3B. To form the seal 4, generally a dispense method and a screen print method are used; here the seal 4 is formed using the screen print method high in processing capability also in a small liquid crystal display. The shape of the seal 4 is designed so that both the protective wall 19 and the seal 4 formed on the color filter substrate 2 surround the proximity portion of drawing wiring 13 and common electrode 15 formed on terminal substrate 1 in the area outside the area surrounded by the seal 4 when the terminal substrate 1 and the color filter substrate 2 are put on each other (described below).

Subsequently, the color filter substrate 2 and the terminal substrate 1 formed with the orientation film like the color filter substrate 2 are opposed to and put on each other as in FIG. 4A. When they are put on each other, while a predetermined pressure is applied, heat treatment is performed, whereby the color filter substrate 2 and the terminal substrate 1 can be put on each other at a predetermined substrate-to-substrate distance determined by the columnar spacers 18. The terminal substrate 1 has the general configuration as previously described with reference to FIG. 2 and therefore the manufacturing method may also be a general method and the manufacturing step will not be discussed.

Figure 4B:
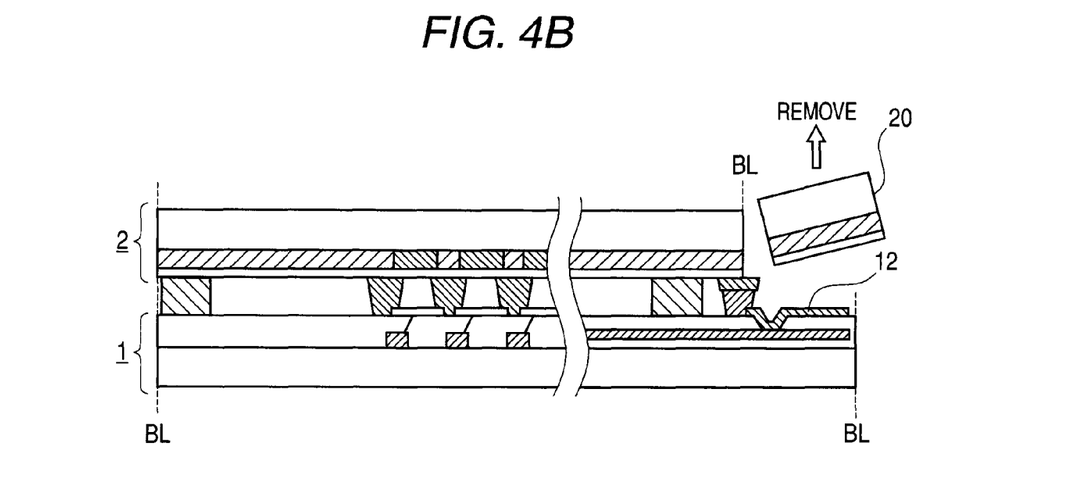

Further, each substrate cut planned line BL is formed with a cut scratch and then pressure is applied, thereby cutting to cells corresponding to a plurality of liquid crystal displays as shown in FIG. 4B. The color filter substrate 2 in the portion opposed to terminal 12 is unnecessary and therefore is removed as a cut piece 20 as indicated by the arrow in the figure at the cutting time. Here, removal of the cut piece 20 at the cutting time is facilitated by using a material lower in strength than the columnar spacers 18 in the portion of the protective wall 19 in contact with the color filter substrate 2 as previously described with reference to FIG. 3A. When the cut scratch is formed, after completion of the cutting, etc., cleaning treatment of removing glass cuttings, etc., is performed as required.

Last, the cells are evacuated and liquid crystal 5 is injected through an injection hole made in the seal 4 and then the injection hole is sealed and a cleaning step, etc., is executed, whereby the liquid crystal display shown in FIG. 2 is completed. Here, the manufacturing method of the liquid crystal display of the first embodiment using the vacuum injecting method of injecting liquid crystal through an injection hole has been described. However, the manufacturing method of the liquid crystal display of the first embodiment is not limited to it and a method of forming a closed seal 4 with no injection hole and applying the liquid crystal 5 like droplets to the area surrounded by the seal 4 before the substrates are put on each other as previously described with FIG. 4A and then putting them on each other with the liquid crystal 5 between, namely, a droplet injecting method may be used.

In the liquid crystal display thus manufactured, in the portion formed in the area outside the area surrounded by the seal 4 of the drawing wiring 13, the proximity portion of the drawing wiring 13 and the common electrode 15 formed on the surface of the color filter substrate 2 is protected by the space surrounded by the seal 4 and the protective wall 19. Usually, when the proximity portion comes in contact with liquid, it becomes a portion where particularly corrosion easily occurs because of the battery effect; in the first embodiment, however, the proximity portion is protected by the protective wall 19 and thus does not come in contact with cleaning liquid, rinse liquid, etc., in cleaning at the cutting time or cleaning after liquid crystal injecting and the drawing wiring 13 does not corrode.

Corrosion may occur due to the battery effect as the common electrode 15 and the drawing wiring 13 or the terminal 12 come in contact with liquid at the same time. Thus, as in the liquid crystal display in FIG. 2, the surface of the common electrode 15 formed on the surface of the color filter substrate 2 extending to the outside of the seal 4 is covered with the protective wall 19 in the end part of the color filter substrate 2, whereby liquid can be made hard to come in contact with the common electrode 15 and corrosion can be prevented.

As described above, corrosion is made hard to occur in the drawing wiring 13, so that chemical liquid having strong detergency such as acid or alkali can be used as the cleaning liquid. As material of the drawing wiring 13, material easy to corrode although it is low resistance, such as Al (aluminum) or Mo (molybdenum), can also be used and flexibility of design can be improved.

In the first embodiment, to allow the cut piece 20 to be easily separated from the protective wall 19 in removing the cut piece 20 in the portion opposed to the terminal 12 at the substrate cutting time, the protective wall 19 is formed of two types of materials of the same material as and different material from the columnar spacers 18 and the protective wall base 19a is formed of material lower in strength than the columnar spacers 18. However, the configuration is not limited to it because the cut piece 20 needs only to be able to be easily separated from the protective wall 19; the protective wall 19 may be formed of a plurality of types of materials different in strength and material having the lowest strength may be placed in the portion touching the color filter substrate 2. If the adhesion of the protective wall 19 and the color filter substrate 2 is made weaker than that of the seal 4 and the color filter substrate 2, a similar advantage can be provided.

As described above, in the first embodiment, both the protective wall 19 and the seal 4 surround the proximity portion of the drawing wiring 13 and the common electrode 15 formed on the terminal substrate 1 in the area outside the area surrounded by the seal 4, whereby corrosion is made hard to occur in the drawing wiring 13, so that yield degradation caused by corrosion on the terminal periphery can be suppressed and a highly reliable liquid crystal display can be provided easily.

Second Embodiment

In the first embodiment, the columnar spacers 18 are formed on the color filter substrate 2 and accordingly, the protective wall 19 is also formed on the color filter substrate 2. In contrast, a second embodiment of the invention is a modified example of changing the placement in the first embodiment so as to form the columnar spacers 18 and the protective wall 19 on the terminal substrate 1. The second embodiment will be discussed.

Figure 5:
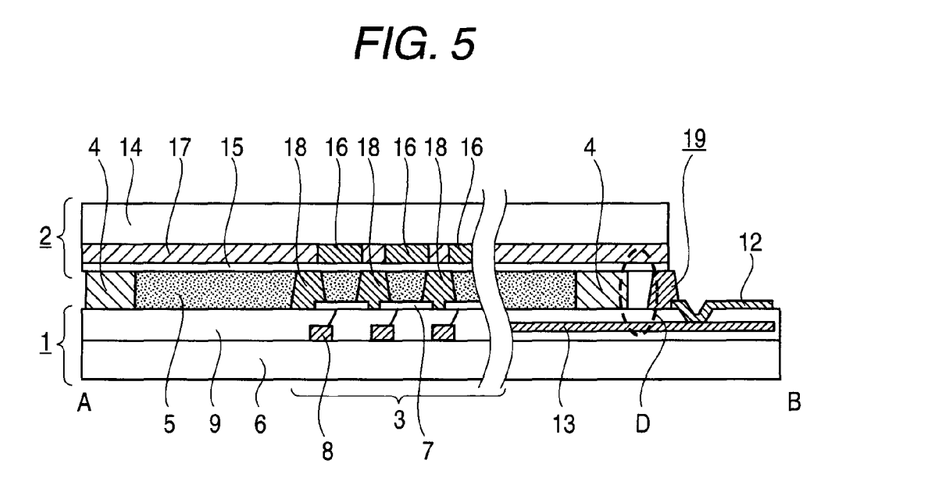
FIG. 5 is a sectional view to show a liquid crystal display in a second embodiment of the invention.

To begin with, the configuration of a liquid crystal display of the second embodiment will be discussed with a sectional view of FIG. 5. The second embodiment differs from the first embodiment in that columnar spacers 18 and a protective wall 19 formed of only the same material as the columnar spacers 18 are formed so that they are fixedly secured to a terminal substrate 1. The configuration other than the change is similar to that of the first embodiment previously described with reference to FIG. 2 and therefore will not be discussed again in detail.

Figure 6:
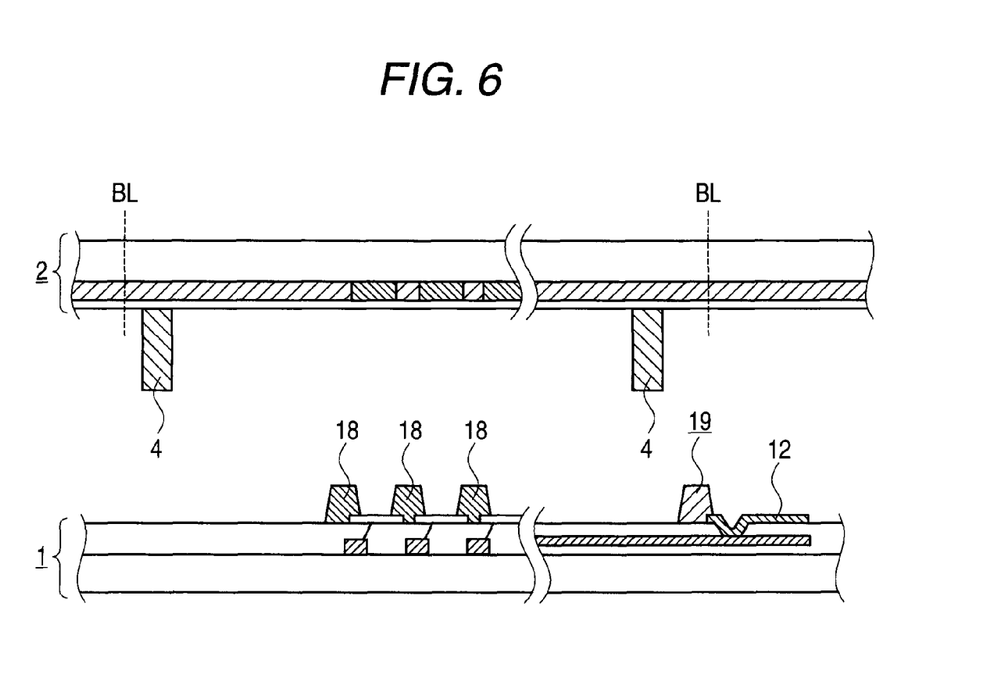
FIG. 6 is a sectional view in a manufacturing method of the liquid crystal display in the second embodiment of the invention.

Subsequently, a manufacturing method of the liquid crystal display of the second embodiment will be discussed with FIG. 6. FIG. 6 corresponds to FIG. 4A of a schematic representation of the manufacturing method in the first embodiment. For the manufacturing method, only change will also be discussed as in the description of the configuration and the manufacturing method other than the change is similar to that of the first embodiment previously described with reference to FIGS. 3A, 3B and FIG. 4A, 4B and therefore will not be discussed again in detail.

In the second embodiment, the columnar spacers 18 are formed on the terminal substrate 1 as shown in FIG. 6. At the same time, the protective wall 19 is also formed on the terminal substrate 1. As with the first embodiment, the columnar spacers 18 are formed of a photosensitive resin and the protective wall 19 is also formed of the same material as the columnar spacers 18 so as to be across on the top of a cut planned line BL. Further, the patterns and placement of a seal 4 and the protective wall 19 are designed so that both the protective wall 19 and the seal 4 surround the proximity portion of drawing wiring 13 and a common electrode 15 formed on the terminal substrate 1 in the area outside the area surrounded by the seal 4 when the terminal substrate 1 and a color filter substrate 2 are put on each other.

In the second embodiment, the protective wall 19 is formed so that it is fixedly secured to the terminal substrate 1, and is only pressed against the color filter substrate 2 and therefore the adhesion of the protective wall 19 and the color filter substrate 2 is weaker than that of the seal 4 and the color filter substrate 2. Thus, a cut piece 20 in the portion opposed to a terminal 12 at the substrate cutting time is not fixedly secured to the protective wall 19 and removing the cut piece 20 is facilitated. Thus, in the second embodiment, the need for using a material having low strength for the protective wall base 19a as in the first embodiment is eliminated and the protective wall base 19a can be formed only of the same material as the columnar spacers 18 at the same time, so that a similar advantage to that of the first embodiment can be provided without increasing the number of steps.

Also in the second embodiment, both the protective wall 19 and the seal 4 surround the proximity portion of the drawing wiring 13 and the common electrode 15 formed on the terminal substrate 1 in the area outside the area surrounded by the seal 4, whereby corrosion is made hard to occur in the drawing wiring 13, so that yield degradation caused by corrosion on the terminal periphery can be suppressed and a highly reliable liquid crystal display can be provided easily.

Third Embodiment

In the second embodiment, the columnar spacers 18 and the protective wall 19 are formed of the same material on the terminal substrate 1 at the same time. In contrast, a third embodiment of the invention is a modified example of changing the second embodiment so as to place the columnar spacers 18 so that it is fixedly secured to the color filter substrate 2 as in the first embodiment and form the columnar spacers 18 and the protective wall separately. The third embodiment will be discussed.

Figure 7:
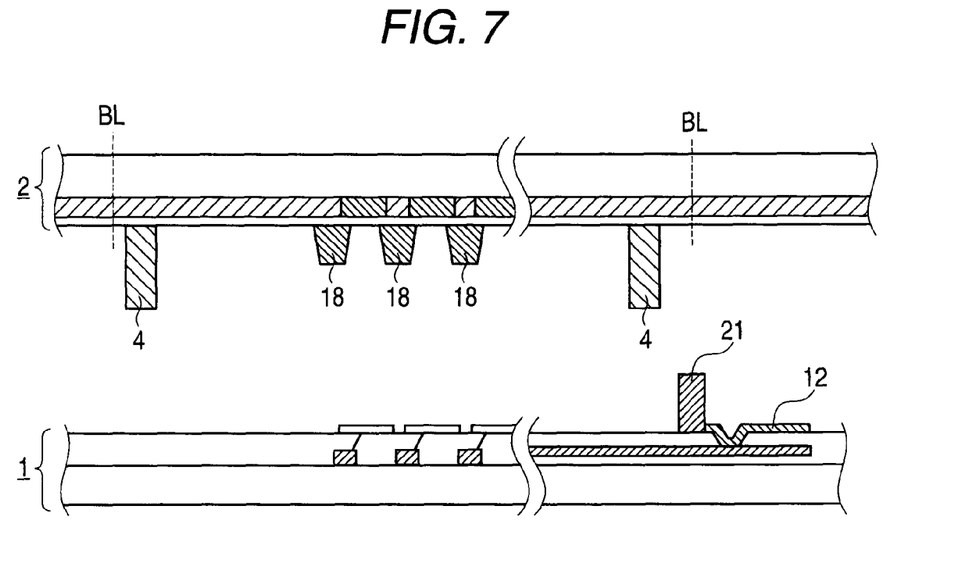
FIG. 7 is a sectional view in a manufacturing method of a liquid crystal display in a third embodiment of the invention.

A manufacturing method of a liquid crystal display of the third embodiment will be discussed with FIG. 7. FIG. 7 corresponds to FIG. 6 of a schematic representation of the manufacturing method in the second embodiment. As shown in FIG. 7, in the third embodiment, unlike the second embodiment, columnar spacers 18 are formed on a color filter substrate 2 and a protective wall 21 is formed of a sealing compound made of uncured resign independently of the columnar spacers 18 on the terminal substrate 1. As the material of the sealing compound, resin of the same material as a seal 4 may be used or resin of a different material may be used; a material having low adhesion when pressed against the color filter substrate 2 after cure is particularly desirable. The sealing compound to form the protective wall 21 is previously cured by heat, etc., before being put in FIG. 7.

As with the second embodiment, the protective wall 21 is formed so as to be across on the top of a cut planned line BL. Further, the patterns and placement of the seal 4 and the protective wall 21 are designed so that both the protective wall 21 and the seal 4 surround the proximity portion of drawing wiring 13 and a common electrode 15 formed on the terminal substrate 1 in the area outside the area surrounded by the seal 4 when they are put on each other. Other points of the configuration and the manufacturing method are similar to those of the second embodiment and therefore will not be discussed again.

Also in the third embodiment, the protective wall 21 formed of the sealing compound is cured before put on each other, so that the protective wall 21 is not fixedly secured to the color filter substrate 2 and removing of a cut piece 20 in the portion opposed to a terminal 12 at the substrate cutting time is facilitated. Further, both the protective wall 21 and the seal 4 surround the proximity portion of the drawing wiring 13 and the common electrode 15 formed on the terminal substrate 1 in the area outside the area surrounded by the seal 4, whereby corrosion is made hard to occur in the drawing wiring 13, so that yield degradation caused by corrosion on the terminal periphery can be suppressed and a highly reliable liquid crystal display can be provided easily.

Fourth Embodiment

In the third embodiment, the protective wall 21 formed of the sealing compound is put after the terminal substrate 1 and the color filter substrate 2 are cured. In contrast, a fourth embodiment of the invention is a modified example of changing the third embodiment so as to put the terminal substrate 1 and the color filter substrate 2 on each other without curing the protective wall 21 formed of the sealing compound and cut and remove the cut piece 20 with the sealing compound uncured. The fourth embodiment will be discussed.

Figure 8A:
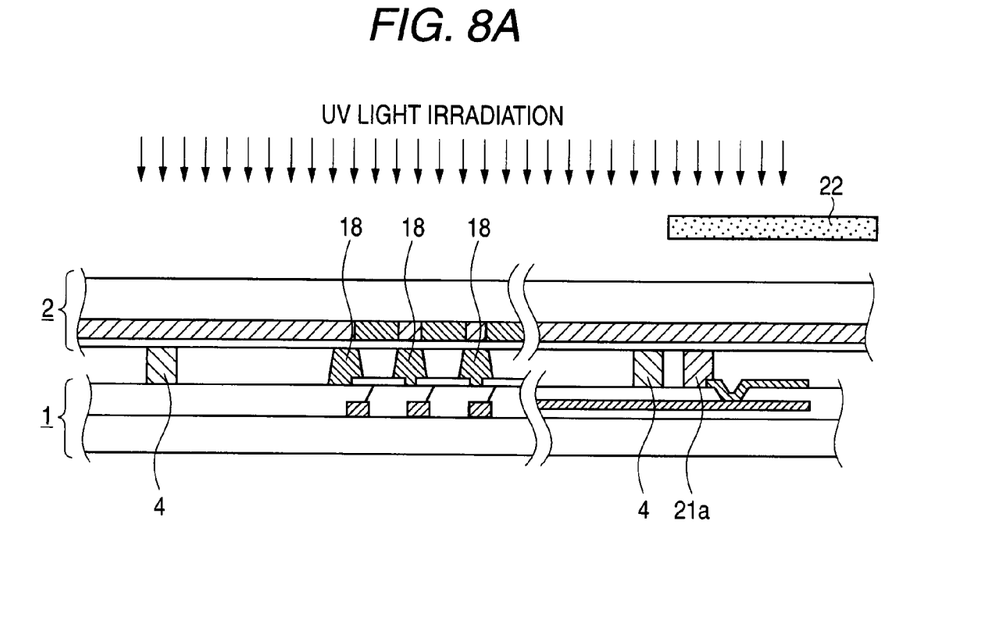
FIGS. 8A and 8B are sectional views in manufacturing methods of a liquid crystal display in a fourth embodiment of the invention and a modified example thereof.

A manufacturing method of a liquid crystal display of the fourth embodiment will be discussed with FIG. 8A. FIG. 8A corresponds to the state after put on each other in FIG. 7 of a schematic representation of the manufacturing method in the third embodiment. As shown in FIG. 8A, in the fourth embodiment, a seal 4 and a protective wall 21a formed of a sealing compound are formed of the same photo-curing resin (here, UV-curing resin cured by irradiation with UV light is used). The seal 4 and the protective wall 21a are made of uncured resin at the forming time. After put on each other, only the portion of the protective wall 21a is covered with a mask 22 and UV light irradiation is executed so as not to irradiate the protective wall 21a with UV light, as shown in FIG. 8A. Accordingly, only the sealing compound forming the seal 4 can be selectively irradiated with the UV light for curing the seal 4. Then, substrate cutting is performed in a similar manner to the method previously described with FIG. 4B in the first embodiment and a cut piece 20 in the portion opposed to a terminal 12 is removed. After completion of the removal of the cut piece 20, the whole substrate is irradiated with UV light, whereby the sealing compound forming the protective wall 21a is also cured.

As with the third embodiment, the protective wall 21a is formed so as to be across on the top of a cut planned line BL and the patterns and placement of the seal 4 and the protective wall 21a are designed so that both the protective wall 21a and the seal 4 surround the proximity portion of drawing wiring 13 and a common electrode 15 formed on a terminal substrate 1 in the area outside the area surrounded by the seal 4 when they are put on each other. Other points of the configuration and the manufacturing method are similar to those of the third embodiment and therefore will not be discussed again.

In the fourth embodiment described above, at the substrate cutting time, the sealing compound forming the protective wall 21a is in a state of uncured resin, so that the protective wall 21a is not fixedly secured to a color filter substrate 2 and removing the cut piece 20 in the portion opposed to the terminal 12 at the cutting time is facilitated. Since the seal 4 and the protective wall 21a use the same sealing compound, they can also be formed on the terminal substrate 1 or the color filter substrate 2 at the same time and the number of steps can be reduced.

As described above, also in the fourth embodiment, both the protective wall 21a and the seal 4 surround the proximity portion of the drawing wiring 13 and the common electrode 15 formed on the terminal substrate 1 in the area outside the area surrounded by the seal 4, whereby corrosion is made hard to occur in the drawing wiring 13, so that yield degradation caused by corrosion on the terminal periphery can be suppressed and a highly reliable liquid crystal display can be provided easily.

Figure 8B:
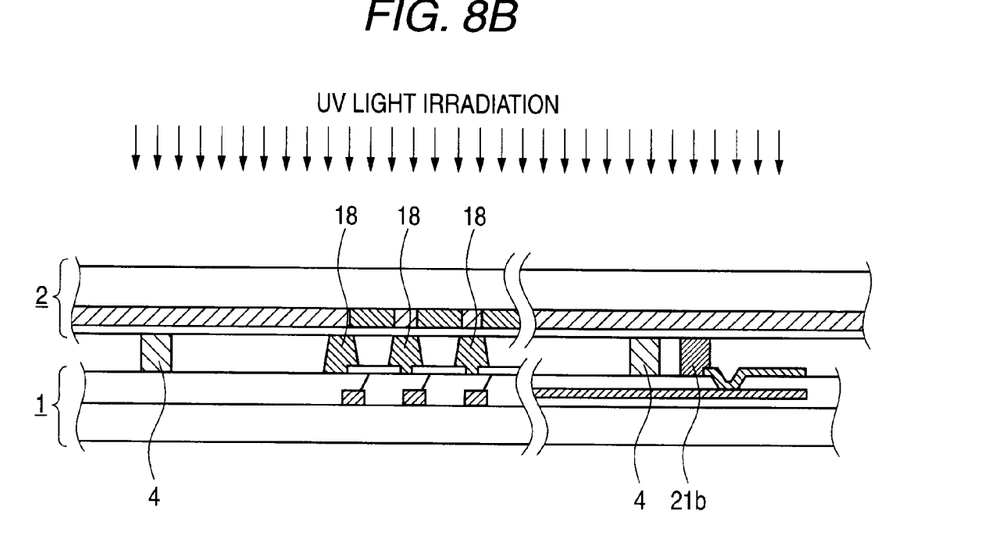

Subsequently, as a modified example of the fourth embodiment, a method of changing the protective wall 21a formed of the sealing compound made of photo-curing resin to that made of thermoset resin not subjected to photo-curing will be discussed with FIG. 8B. The protective wall 21a in FIG. 8A is changed to a protective wall 21b made of thermoset resin not subjected to photo-curing. Accordingly, the full face can be irradiated with UV light, thereby curing only the seal 4 selectively, as shown in FIG. 8B. Therefore, removing the cut piece 20 in the portion opposed to the terminal 12 at the substrate cutting time is facilitated as with the fourth embodiment previously described with FIG. 8A. After completion of the removal of the cut piece 20, the whole substrate is heated to a predetermined temperature, whereby heat is also applied to the sealing compound forming the protective wall 21b and thus is cured (set). Other points of the configuration are similar to those of the fourth embodiment, so that a similar advantage to that of the fourth embodiment can also be provided in the modified example described above.

Fifth Embodiment

Subsequently, a fifth embodiment of a modified example of providing a terminal protective wall for protecting a terminal in addition to the protective wall described in the first to fourth embodiments will be discussed.

Figure 9A:
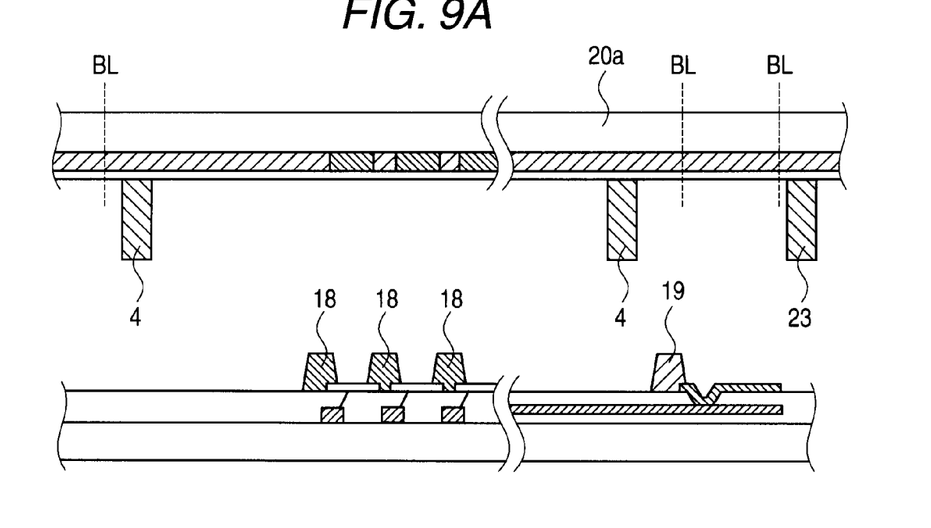
FIGS. 9A and 9B are sectional views in a manufacturing method of a liquid crystal display in a fifth embodiment of the invention.
Figure 9B:
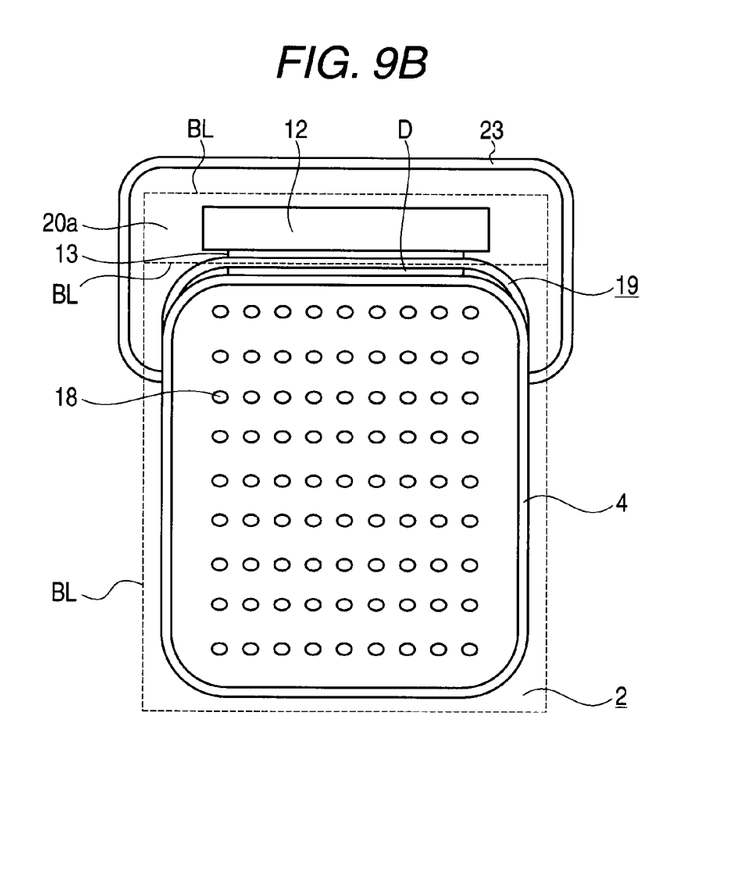

A manufacturing method of a liquid crystal display of the fifth embodiment will be discussed with FIGS. 9A and 9B. FIG. 9A corresponds to FIG. 5 of a schematic representation of the manufacturing method in the second embodiment and FIG. 9B corresponds to a plan view in FIG. 9A. As shown in FIG. 9A, in the fifth embodiment, like the second embodiment, columnar spacers 18 and a protective wall 19 are formed on a terminal substrate 1. In addition, as shown in FIG. 9B, a terminal protective wall 23 for isolating and protecting a terminal 12 from the outside is formed on a color filter substrate 2. The terminal protective wall 23 is designed so that both the terminal protective wall 23 and a seal 4 or the protective wall 19 surround the terminal 12 in the area outside the area surrounded by the seal 4 or the protective wall 19 when they are put on each other.

The terminal protective wall 23 does not cover a cut piece area 20a surrounded by a cut planned line BL indicated by the dotted line in FIG. 9B so as not to hinder removal of cut piece 20 in the opposed portion to the terminal 12 at the substrate cutting time previously described with FIG. 4B in the first embodiment because the terminal protective wall 23 is formed as it is fixedly secured onto the color filter substrate 2 in the fifth embodiment. Other points of the configuration and the manufacturing method are similar to those of the first embodiment and therefore will not be discussed again.

The fifth embodiment has a similar advantage to that of the first embodiment and also has the following advantage because the terminal protective wall 23 surrounds not only the proximity portion of drawing wiring 13 and a common electrode 15, but also the terminal 12. In the process until liquid crystal display is cut according to the cut planned line BL shown in FIG. 9B, the terminal 12 does not come in contact with cleaning liquid, so that chemical liquid having strong detergency such as acid or alkali can be used as the cleaning liquid and thus yield can be improved. As material of the terminal 12, it is also made possible to use material easy to corrode due to water, etc., such as Al (aluminum) or Mo (molybdenum), and flexibility of design can be improved.

In addition to the advantages described above, also in the fifth embodiment, both the protective wall 19 and the seal 4 surround the proximity portion of the drawing wiring 13 and the common electrode 15 formed on the terminal substrate 1 in the area outside the area surrounded by the seal 4, whereby corrosion is made hard to occur in the drawing wiring 13, so that yield degradation caused by corrosion on the terminal periphery can be suppressed and a highly reliable liquid crystal display can be provided easily.

Figure 10A:
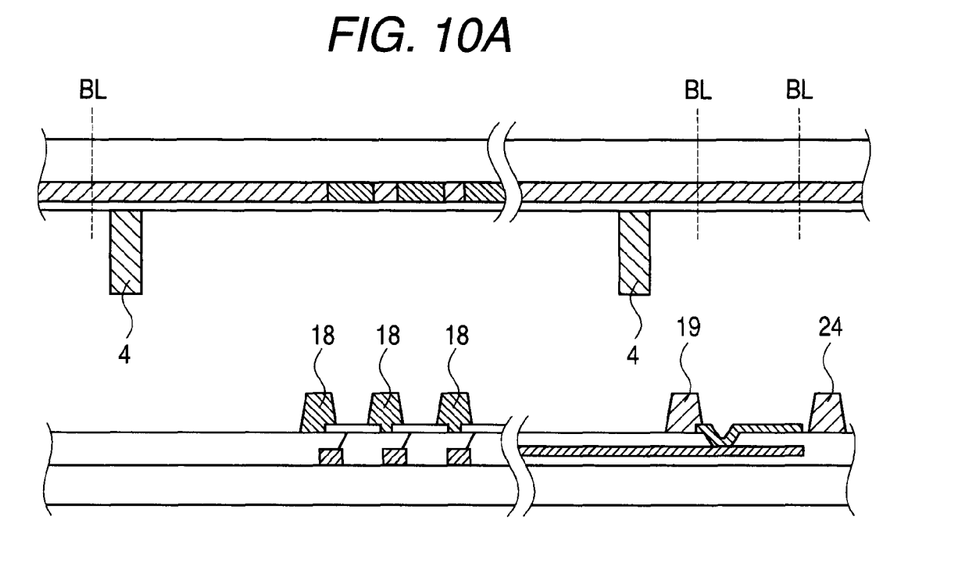
FIGS. 10A and 10B are sectional views in a manufacturing method of a liquid crystal display in a modified example of the fifth embodiment of the invention.

Subsequently, a modified example of forming the terminal protective wall of the fifth embodiment of the same material as columnar spacers will be discussed. First, a manufacturing method of a liquid crystal display of the modified example will be discussed with FIGS. 10A and 10B. FIG. 10A corresponds to FIG. 9A of a schematic representation of the manufacturing method in the fifth embodiment and FIG. 10B corresponds to a plan view in FIG. 10A.

Figure 10B:
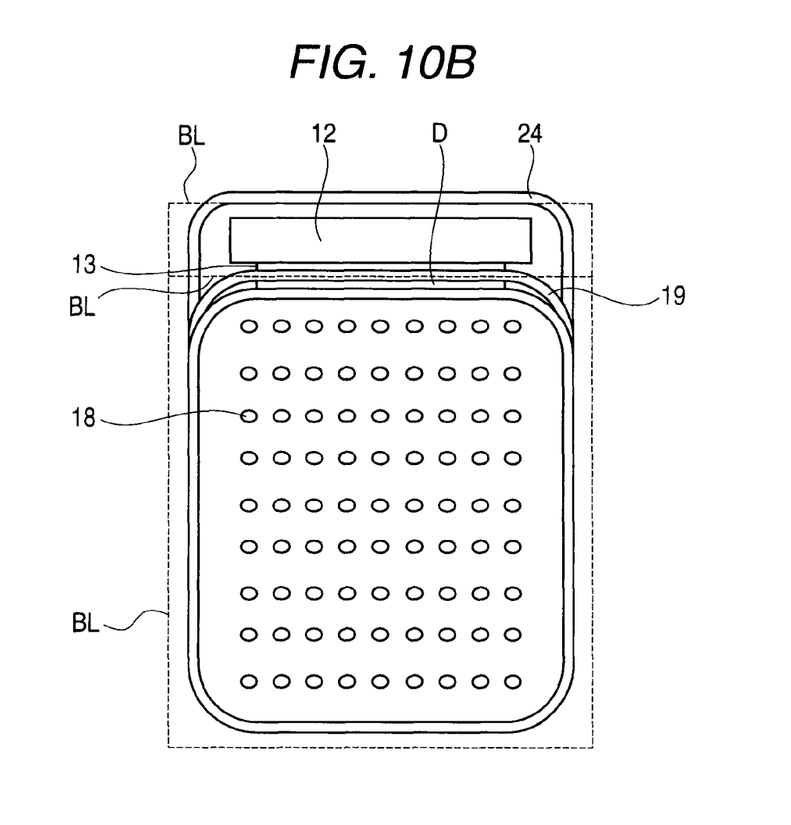

The modified example differs from the fifth embodiment in that a terminal protective wall 24 for isolating and protecting a terminal 12 from the outside is formed of the same material as columnar spacers 18 at the same time on a terminal substrate 1 as shown in FIG. 10A. Since the terminal protective wall 24 is formed of the same material as the columnar spacers 18 on the terminal substrate 1, it is not fixedly secured to a color filter substrate 2 and thus covers a cut piece area 20a surrounded by a cut planned line BL indicated by the dotted line as shown in FIG. 10B unlike the fifth embodiment. Other points of the configuration and the manufacturing method are similar to those of the fifth embodiment and therefore will not be discussed again.

In the modified example described above, the terminal protective wall 24 and the columnar spacers 18 can be formed of the same material as at the same time, so that a similar advantage to that of the fifth embodiment can be provided without increasing the number of steps. Since it is possible to allow the terminal protective wall 24 to cover the cut piece area 20a, the terminal protective wall 23 need not largely extend to the area of an adjacent liquid crystal display. Consequently, it is made possible to place displays close to each other and the use efficiency of a glass substrate can be improved as compared with the fifth embodiment.

The first to fifth embodiments have been described using TFTs as an example of the switching elements 8, but thin-film diodes are also contained in the switching elements 8 and in addition, all elements capable of actively controlling a signal are contained. For liquid crystal displays, etc., using the switching elements 8, similar advantages are all provided if there is a proximity portion of a connection conductor and a conductive film for electrically connecting wiring and a terminal in a display area in an area outside the area surrounded by a seal.

As the first to fifth embodiments, the liquid crystal displays having the switching elements 8 have been described taking examples. For the case where the switching elements 8 are not included as in a passive liquid crystal display, etc., similar advantages are also all provided if there is a proximity portion of a connection conductor and a conductive film for electrically connecting wiring and a terminal in a display area in an area outside the area surrounded by a seal.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A liquid crystal display, comprising:
   a terminal substrate including
      a display area which displays an image,
      a terminal which inputs an external signal to a wiring in the display area, and
      a connection conductor which electrically connects the wiring in the display area and the terminal;
   an opposed substrate including a conductive film on a surface thereof;
   a seal member which surrounds the display area and through which the terminal substrate and opposed substrate are attached with each other while being opposed with each other; and
   a protective wall fixedly secured to one of the terminal substrate and the opposed substrate and extending across a spacing between the substrates surrounding a proximity portion of the connection conductor and the conductive film outside of an area surrounded by the seal member, together with the seal member to isolate and protect the proximity portion from an outside, wherein adhesion between the protective wall and the opposed substrate is weaker than that between the seal member and the opposed substrate.

2. The liquid crystal display according to claim 1, further comprising:
   a columnar spacer which is fixed to either one of the terminal substrate and the opposed substrate to adjust a distance between the terminal substrate and the opposed substrate, wherein, the opposed substrate is attached to be opposed to the terminal substrate through the columnar spacer, and the protective wall is made of a same material as the columnar spacer.

3. The liquid crystal display according to claim 1, wherein the conductive film on the surface of the opposed substrate is formed to extend from the display area to outside of the area surrounded by the seal member.

4. The liquid crystal display according to claim 1, wherein, the protective wall is made of a plurality of types of materials different in strength, and a material having the lowest strength among the plurality of types of materials is disposed in a portion touching the opposed substrate.

5. A manufacturing method of a liquid crystal display including a terminal substrate including a display area which displays an image, a terminal which inputs an external signal to a wiring in the display area, and a connection conductor made of a metal thin film which electrically connects the wiring in the display area and the terminal; and an opposed substrate including a conductive film on a surface thereof, the manufacturing method comprising:

forming a seal member on either one of the terminal substrate and the opposed substrate to surround the display area;

attaching the terminal substrate and the opposed substrate with each other through the seal member, while the terminal substrate and the opposed substrate are opposed with each other; and forming a protective wall fixedly secured on either one of the terminal substrate and the opposed substrate before the attaching, wherein the protective wall extends across a spacing between the substrates and surrounds a proximity portion of the connection conductor and the conductive film outside of an area surrounded by the seal member when the terminal substrate and the opposed substrate are attached with each other, together with the seal member to isolate and protect the proximity portion from an outside, and adhesion between the protective wall and the opposed substrate is weaker than that between the seal member and the opposed substrate.

6. The manufacturing method according to claim 5, further comprising:

forming a columnar spacer which adjusts a distance between the terminal substrate and the opposed substrate, on the terminal substrate, wherein the forming the protective wall and the forming the columnar spacer are performed by patterning a same material at the same time.

7. The manufacturing method according to claim 5, wherein, the seal member and the protective wall are made of an uncured resin, and the forming the seal member and the forming the protective wall are performed before the attaching, the manufacturing method further comprising:
curing the seal member after the attaching;
cutting and removing a portion of the opposed substrate which is opposed to the terminal, after the curing the seal member; and
curing the protective wall after removing the portion of the opposed substrate.

8. The manufacturing method according to claim 7, wherein, the seal member and the protective wall are made of a photo-curing resin, and the curing the seal member is performed by selectively irradiating the seal member with light to not irradiate the protective wall with light.

9. The manufacturing method according to claim 7, wherein, the seal member is made of a photo-curing resin, the protective wall is made of a thermoset resin, the curing the seal member is performed by irradiating the seal member with light, and the curing the protective wall is performed by applying heat to the protective wall.

10. The manufacturing method according to claim 5, wherein the protective wall is made of a photo-curing material and formed on the terminal substrate, the manufacturing method further comprising:
curing the protective wall before the attaching; and
cutting and removing a portion of the opposed substrate which is opposed to the terminal after the attaching.

11. The manufacturing method according to claim 5, further comprising:

forming a terminal protective wall before the attaching, wherein the terminal protective wall surrounds the terminal outside of an area surrounded by the protective wall and the seal member when the terminal substrate and the opposed substrate are attached with each other, together with at least one of the protective wall and the seal member to isolate and protect the terminal from the outside.

12. The manufacturing method according to claim 11, further comprising:

cutting and removing a portion of the opposed substrate which is opposed to the terminal when the terminal substrate and the opposed substrate are attached with each other, wherein, the forming the terminal protective wall and the forming the seal member are performed by applying a same material at the same time, and the terminal protective wall is formed to not cover the portion to be cut and removed.

13. The manufacturing method according to claim 11, further comprising:

forming a columnar spacer which adjusts a distance between the terminal substrate and the opposed substrate, on either one of the terminal substrate and the opposed substrate, wherein the forming the protective wall, the forming the columnar spacer and the forming the terminal protective wall are performed by patterning a same material at the same time.

* * * * *